US005264259A

United States Patent [19]
Satoh et al.

[11] Patent Number: 5,264,259
[45] Date of Patent: Nov. 23, 1993

[54] ENERGY ABSORBING STRUCTURE

[75] Inventors: Hajime Satoh, Hiratsuka; Hiroshi Hirakawa, Isehara; Hiroyuki Hamada, Shiga, all of Japan

[73] Assignee: The Yokohama Rubber Co., Ltd., Tokyo, Japan

[21] Appl. No.: 820,837

[22] Filed: Jan. 15, 1992

[30] Foreign Application Priority Data

Jan. 21, 1991 [JP] Japan ................... 3-5213

[51] Int. Cl.⁵ .................... E02B 3/26; B63B 59/02
[52] U.S. Cl. .................... 428/34.5; 428/36.92; 428/116; 428/218; 248/636; 248/345.1; 114/219; 405/212; 405/215
[58] Field of Search ............ 428/34.4, 34.5, 34.6, 428/34.7, 36.1, 36.3, 36.9, 36.91, 36.92, 366, 368, 218, 430, 116, 117, 118, 902, 910, 458; 248/636, 638, 345.1; 5/481, 48, 420, 905; 114/219, 220; 405/212, 213, 215, 216

[56] References Cited

U.S. PATENT DOCUMENTS

| | | | |
|---|---|---|---|
| 1,915,249 | 6/1933 | Jorgensen | 248/345.1 |
| 4,278,726 | 7/1981 | Wieme | 428/229 |
| 4,330,494 | 5/1982 | Iwata et al. | 428/117 |
| 4,409,274 | 10/1983 | Chaplin et al. | 428/113 |
| 4,515,502 | 5/1985 | Kajigaya et al. | 405/215 |
| 4,548,150 | 10/1985 | Drewett | 114/219 |
| 4,612,241 | 9/1986 | Howard, Jr. | 428/294 |
| 4,848,969 | 7/1989 | Murota et al. | 405/215 |
| 4,964,913 | 10/1990 | Takada et al. | 428/364 |
| 5,030,490 | 7/1991 | Bronowicki et al. | 428/36.3 |
| 5,087,491 | 2/1992 | Barrett | 428/34.5 |
| 5,127,354 | 7/1992 | Magrab et al. | 405/215 |
| 5,128,200 | 7/1992 | Colley et al. | 428/36.1 |

Primary Examiner—Ellis P. Robinson
Assistant Examiner—Rena L. Dye
Attorney, Agent, or Firm—Nikaido, Marmelstein, Murray & Oram

[57] ABSTRACT

The energy absorbing structure of the present invention comprises a cylindrical hollow body of a fiber reinforced thermoplastic resin wherein both the ends are open, the cylindrical hollow body being attached to the outer wall of a moving body or the outer wall of a stationary body with which the moving body comes in contact in such a manner that the opening of the hollow body faces the outer wall.

17 Claims, 1 Drawing Sheet

ENERGY ABSORBING STRUCTURE

BACKGROUND OF THE INVENTION

The present invention relates to an energy absorbing structure having an excellent capability of absorbing an impact energy or a compression energy.

In order to absorb the impact energy or compression energy generated when a moving body, such as a vehicle or a ship, collides against each other or against a stationary body, such as a quay wall or a bridge girder, as much as possible, an aluminum honeycomb structure comprising a plurality of cores has hitherto been attached as a cushioning material to the outer wall (or outer surface) of the moving body. The aluminum honeycomb structure, however, could not absorb the energy to a satisfactory extent.

SUMMARY OF THE INVENTION

An object of the present invention is to provide an energy absorbing structure having an excellent capability of absorbing an energy generated in case of collision.

In order to attain the above-described object, the energy absorbing structure of the present invention comprises a cylindrical hollow body of a fiber reinforced thermoplastic resin wherein the length from one end to the other end is uniform around the whole periphery and both ends are open, said cylindrical hollow body being attached to the outer wall of a moving body or the outer wall of a stationary body with which the moving body comes in contact in such a manner that the opening of the hollow body faces the outer wall, said cylindrical hollow body containing fibers obliquely orienting at an angle of 0° to 45° to the axial direction of said hollow body and having a tapered shape in both or one of its ends formed by obliquely chamfering said end(s) of said cylindrical hollow body from the inner side towards the outer side around the whole periphery of said cylindrical hollow body.

Thus, in the present invention, since a tapered cylindrical hollow body of a fiber reinforced thermoplastic resin having obliquely chamfered end(s) is used as a cushioning material, it is possible to sufficiently absorb an energy derived from collision.

DETAILED DESCRIPTION OF THE PREFERRED EMBODIMENTS

Figure 1:
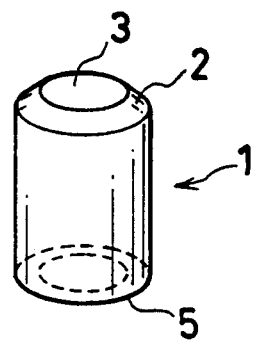
FIG. 1 is a perspective explanatory view of one embodiment of a cylindrical hollow body of a fiber reinforced thermoplastic resin used in the present invention.
Figure 2:
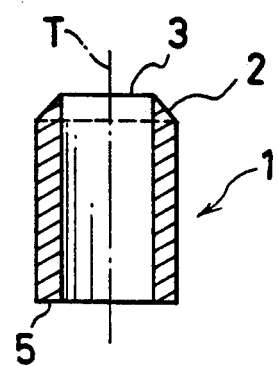
FIG. 2 is a cross-sectional view of the cylindrical hollow body shown in the FIG. 1.

In FIGS. 1 and 2, a cylindrical hollow body 1 of a fiber reinforced thermoplastic resin comprises a fiber and a thermoplastic resin. Examples of the fiber in this case include carbon, glass, aromatic polyamide, silicon carbide, boron and alumina fibers. There is no particular limitation on the thermoplastic resin, and examples thereof include thermoplastic resins having a high melting point or a high softening point, such as polyether ether ketone (PEEK), polyphenylene sulfide (PPS), polyether imide (PEI), polyether sulfone (PES), polyarylene ketone, polyarylene sulfide, polyaryl imide, polyallyl imide, polyimide, polyimide sulfone, polyaryl sulfone and polyester. It is particularly preferred to use a thermoplastic resin having a melting point of 200° C. or above, i.e., the so-called engineering plastic or super engineering plastic.

In producing the cylindrical hollow body 1 of a fiber reinforced thermoplastic resin, a prepreg comprising a matrix of the thermoplastic resin and, incorporated therein, the fiber is first interposed between a thermally expandable core and an outer die provided outside the core, and the prepreg and the core are heated at or above the plasticizing temperature of the thermoplastic resin to expand the core and then cooled. Specific examples of the prepreg comprising a thermoplastic resin as a matrix used in this embodiment include one prepared by impregnating a thermoplastic resin as a matrix into a fiber bundle called a tow comprising a plurality of continuous fibers doubled to arrange them in a belt form in one direction (unidirectionally doubled prepreg (UD prepreg)). This prepreg has at room temperature neither tackiness nor plasticity and has a high rigidity. The prepreg is in a sheet or slit tape form. The thermally expandable core used in this embodiment is one made of a resin having a heat resistance superior to that of the thermoplastic resin, and examples of the resin include fluororesins such as a polytetrafluoroethylene (PTFE; trademark Teflon), a polyfluoroalkoxyethylene resin (PFA) and a fluorinated ethylene propylene ether copolymer resin (FEP). The outer die comprises, for example, a metallic pipe such as a copper pipe.

As described in the FIGS. 1 and 2, in the cylindrical hollow body 1 of a fiber reinforced thermoplastic resin, the length from one end to the other end should be uniform around the whole periphery and both ends should be open. In this cylindrical hollow body 1, the fibers should be obliquely oriented at an angle of 0 to 45°, preferably 5 to 25° to the direction of the axis T of the cylindrical hollow body 1 (fiber angle). This is because the capability of absorbing energy in case of collision becomes poor when the fibers are obliquely oriented at an angle exceeding 45°.

As shown in the FIGS. 1 and 2, the end 2 of the cylindrical hollow body 1 of a fiber reinforced thermoplastic resin has an obliquely chamfered tapered shape, that is, a tapered shape formed by obliquely cutting the cylindrical hollow body 1 from the inner side towards the outer side around the whole periphery of the cylindrical hollow body, the so-called "trigger" shape. In the cylindrical hollow body 1 of a fiber reinforced thermoplastic resin, only one end may be chamfered in this way, or alternatively, both ends may be chamfered. That is, either the end 2 or end 5 or both the ends 2 and 5 may be chamfered. That is, the trigger portion (chamfered portion) may be provided at one end or both ends of the cylindrical hollow body 1. The angle of obliquity of the chamfered portion to the direction of the axis T of the cylindrical hollow body 1 may be about 20 to 60°.

Figure 3:
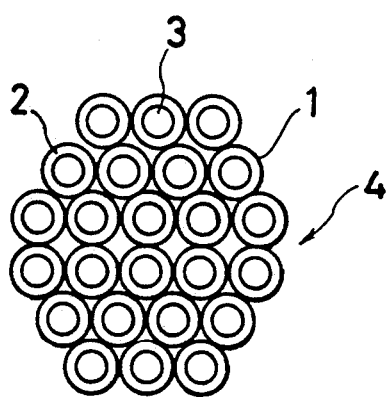
FIG. 3 is a plan view of one embodiment of a bundle of a plurality of cylindrical hollow bodies of a fiber reinforced thermoplastic resin.
Figure 4:
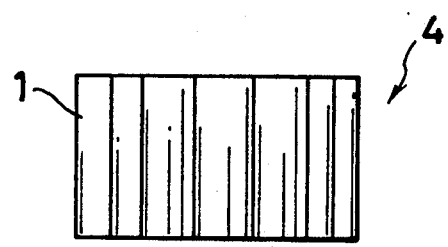
FIG. 4 is a side view of the bundle shown in the FIG. 3.

The energy absorbing structure of the present invention is attached to the outer wall of a moving body, such as a vehicle or a ship, or the outer wall of a stationary body, such as a quay wall or a bridge girder, with which the moving body collides in such a manner that the opening 3 of the cylindrical hollow body 1 of the fiber reinforced thermoplastic resin faces the outer wall. The attaching may be conducted by any suitable means. In attaching the cylindrical hollow body 1 to the outer wall, the cylindrical hollow body 1 may be cut to such a length that no buckling occurs and attached in the form of a bundle 4 of a plurality of cut hollow bodies as shown in FIGS. 3 and 4 although it may be attached in the form of a single cut hollow body.

When the hollow body 1 of a fiber reinforced thermoplastic resin is attached to the outer wall of a moving body or a stationary body in the above-described manner, the collision causes breaking to occur in the trigger portion. The breaking gradually progresses from one end to the other end in the axial direction of the cylindrical hollow body 1 until it reach the other end (the so-called "progressing crushing"). This enables the impact energy or compression energy to be effectively absorbed.

EXAMPLE

Pipes each having an outer diameter of 55 mm and a wall thickness of 2.5 mm were made of composite materials listed in Table 1. In the case of a carbon fiber/polyaryl sulfone pipe, the wall thickness was 3.6 mm. These pipes were subjected to the measurement of compression strength (MPa), crushing load (KN) and amount of energy absorption (kJ/kg) according to the conventional procedure. In the case of a pipe provided with a trigger, the angle of obliquity of the trigger portion to the axis T was 45°. The results are given in the Table 1.

TABLE 1

| Type and fiber angle of composite material | Compression strength (without trigger) (MPa) | Crushing load (with trigger) (KN) | Amt. of energy absorption with trigger) (kJ/kg) |
| --- | --- | --- | --- |
| glass cloth (plain weave)/ epoxy resin ±45° | 256.1 | 47.0 | 65.1 |
| carbon fiber/ epoxy resin | | | |
| 0° | 488.3 | no crushing | |
| 30° | 217.9 | no crushing | |
| 45° | 136.9 | 40.0 | 53.5 |
| carbon fiber/PEEK | | | |
| 0° | 533.8 | 118.0 | 173.9 |
| 5° | 464.8 | 142.5 | 208.6 |
| 10° | 405.3 | 145.5 | 213.0 |
| 15° | 356.8 | 137.0 | 200.5 |
| 20° | 321.0 | 115.5 | 169.7 |
| 25° | 283.7 | 111.2 | 162.8 |
| 30° | 252.5 | 95.0 | 139.1 |
| 45° | 173.7 | 55.3 | 80.9 |
| carbon fiber/ polyaryl sulfone | | | |
| 0° | | no crushing | |
| 5° | | 105 | 113 |
| 10° | | 98 | 105 |
| 15° | | no crushing | |
| 20° | | no crushing | |
| 25° | | no crushing | |
| 30° | | no crushing | |
| 45° | | no crushing | |

As is apparent form the Table 1, each of the carbon fiber/PEEK pipe and the carbon fiber/polyaryl sulfone pipe exhibits a larger energy absorption. Therefore, the energy absorbing structures of the present invention wherein use is made of these pipes have a high capability of absorbing an energy. For reference, the amount of energy absorption in the case of an aluminium honeycomb structure is about 22 to 25 kJ/kg.

As has been described above, the energy absorbing structure of the present invention comprises a cylindrical hollow body of a fiber reinforced thermoplastic resin wherein the length of one end to the other end is uniform around the whole periphery and both the ends are open, said cylindrical hollow body being attached to the outer wall of a moving body or the outer wall of a stationary body with which the moving body comes in contact in such a manner that the opening of the hollow body faces the outer wall, said cylindrical hollow body containing fibers obliquely orienting at an angle of 0° to 45° to the axial direction of said hollow body and having a tapered shape in both or one of its ends formed by obliquely chamfering said end(s) of said cylindrical hollow body from the inner side towards the outer side around the whole periphery of said cylindrical hollow body. This constitution enables the impact energy or compression energy to be sufficiently absorbed.

What is claimed is

1. An energy absorbing structure comprising a cylindrical hollow body of a fiber reinforced thermoplastic resin wherein the length from one end to the other end is uniform around the whole periphery and both the ends are open, said cylindrical hollow body being attached to the outer wall of a moving body which comes in contact with a stationary body in such a manner that the opening of the hollow body faces said outer wall, said cylindrical hollow body containing fibers obliquely orienting at an angle of 0° to 45° to the axial direction of said hollow body and having a tapered shape in both or one of its ends formed by obliquely chamfering said end(s) of said cylindrical hollow body from the inner side towards the outer side around the whole periphery of said cylindrical hollow body.

2. An energy absorbing structure according to claim 1, wherein the moving body is a vehicle.

3. An energy absorbing structure according to claim 2, wherein said vehicle is a ship.

4. An energy absorbing structure according to claim 1, wherein the stationary body is a member selected from a quay wall or a bridge girder.

5. An energy absorbing structure according to claim 1, wherein the fiber constituting the cylindrical hollow body of the fiber reinforced thermoplastic resin is a member selected from the group consisting of carbon, glass, aromatic polyamide, silicon carbide, boron and alumina fibers.

6. An energy absorbing structure according to claim 1, wherein the thermoplastic resin constituting the cylindrical hollow body of the fiber reinforced thermoplastic resin is a member selected from the group consisting of polyether ether ketone, polyphenylene sulfide, polyether imide, polyether sulfone, polyarylene ketone, polyarylene sulfide, polyimide, polyimide sulfone, polyaryl sulfone and polyester.

7. The structure as claimed in claim 1 wherein said cylindrical hollow body consists essentially of said thermoplastic resin and said reinforcing fibers.

8. An energy absorbing structure comprising a cylindrical hollow body of a fiber reinforced thermoplastic resin wherein the length from one end to the other end is uniform around the whole periphery and both the ends are open, said cylindrical hollow body being attached to said outer wall of a stationary body with which a moving body comes into contact in such a manner that the opening of the hollow body faces the outer wall, said cylindrical hollow body containing fibers obliquely orienting at an angle of 0° to 45° to the axial direction of said hollow body and having a tapered shape in both or one of its ends formed by obliquely chamfering said end(s) of said cylindrical hollow body from the inner side towards the outer side around the whole periphery of said cylindrical hollow body.

9. An energy absorbing structure according to claim 8, wherein the moving body is from a vehicle.

10. An energy absorbing structure according to claim 9, wherein said vehicle is a ship.

11. An energy absorbing structure according to claim 8, wherein the stationary body is a member selected from a quay wall or a bridge girder.

12. An energy absorbing structure according to claim 8, wherein the fiber constituting the cylindrical hollow body of the fiber reinforced thermoplastic resin is a member selected from the group consisting of carbon, glass, aromatic polyamide, silicon carbide, boron and alumina fibers.

13. An energy absorbing structure according to claim 8, wherein the thermoplastic resin constituting the cylindrical hollow body of the fiber reinforced thermoplastic resin is a member selected from the group consisting of polyether ether ketone, polyphenylene sulfide, polyether imide, polyether sulfone, polyarylene ketone, polyarylene sulfide, polyimide, polyimide sulfone, polyaryl sulfone and polyester.

14. An assembly of a first surface, adapted to move in relation to a second surface; and an energy absorbing member disposed on said first surface in a position sufficient to interpose between said first and said second surface during said relative movement, and adapted to absorb at least some of the energy of said relative movement by being at least partially axially crushed by said relative movement;
   wherein said energy absorbing member comprises at least one axially hollow, substantially cylindrical member comprising a thermoplastic resin reinforced with a multiplicity of reinforcing fibers disposed in said resin at an angle of up to about 45° with respect to the axis of said cylindrical member; and
   wherein at least one axial end of said cylindrical member is chamfered from an internally directed wall of said cylindrical member toward an external circumferential wall of said cylindrical member.

15. An assembly as claimed in claim 14 wherein said energy absorbing member has substantially axially uniform length about the entire periphery.

16. An axially crushable shaped article, adapted to absorb axially imposed force, comprising at least one substantially hollow, substantially cylindrical member comprising a thermoplastic resin reinforced with a multiplicity of reinforcing fibers disposed in said resin at an angle of up to about 45° with respect to the axis of said cylindrical member; wherein at least one axial end of said cylindrical member is chamfered from an internally directed wall of said cylindrical member toward an external circumferential wall of said cylindrical member.

17. An article as claimed in claim 16 wherein said hollow cylindrical member has substantially axially uniform length about the entire periphery.

* * * * *